US010189426B2

(12) United States Patent
Zhang et al.

(10) Patent No.: US 10,189,426 B2
(45) Date of Patent: Jan. 29, 2019

(54) METHOD AND APPARATUS FOR OPERATING FPGA BOARD IN DRIVERLESS VEHICLE

(71) Applicant: BEIJING BAIDU NETCOM SCIENCE AND TECHNOLOGY CO., LTD., Beijing (CN)

(72) Inventors: Zhao Zhang, Beijing (CN); Jian Ouyang, Beijing (CN); Jing Wang, Beijing (CN); Peng Wu, Beijing (CN); Liang Gao, Beijing (CN); Yupeng Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/411,061

(22) Filed: Jan. 20, 2017

(65) Prior Publication Data
US 2018/0072251 A1 Mar. 15, 2018

(30) Foreign Application Priority Data
Sep. 14, 2016 (CN) .......................... 2016 1 0827237

(51) Int. Cl.
G06F 1/08 (2006.01)
G05D 1/00 (2006.01)
(Continued)

(52) U.S. Cl.
CPC ...... *B60R 16/0236* (2013.01); *B60L 11/1851* (2013.01); *G05D 1/0088* (2013.01); *G06F 1/08* (2013.01); *G06F 1/3287* (2013.01); *G06F 1/3293* (2013.01); *B60L 2200/40* (2013.01); *B60L 2240/12* (2013.01); *B60L 2260/44* (2013.01)

(58) Field of Classification Search
CPC . B60R 16/0236; G05D 1/0088; G06F 1/3287; G06F 1/3293
See application file for complete search history.

(56) References Cited

U.S. PATENT DOCUMENTS

| 2017/0080952 A1* | 3/2017 | Gupta .................... B60K 35/00 |
| 2017/0090476 A1* | 3/2017 | Letwin ................. G05D 1/0077 |
| 2017/0238258 A1* | 8/2017 | Ramalho de Oliveira ................. H04W 52/0261 455/574 |

FOREIGN PATENT DOCUMENTS

| JP | 2006004144 A | * | 1/2006 |
| JP | 2006004144 A | | 1/2006 |

* cited by examiner

*Primary Examiner* — Aaron L Troost
(74) *Attorney, Agent, or Firm* — Lathrop Gage LLP

(57) ABSTRACT

The present application discloses a method and apparatus for operating a field-programmable gate array (FPGA) board in a driverless vehicle. The method according to a specific embodiment includes: collecting driving scenario information on a driving scenario of the driverless vehicle; determining, based on the driving scenario information, a speed at which the driverless vehicle executes a computing operation in the driving scenario; comparing the speed with a speed threshold; switching a working mode of the FPGA board in the driverless vehicle executing the computing operation to reduce power consumption of the FPGA board, in response to the speed being lower than the speed threshold. This embodiment implements the adaptive adjustment of the working mode of the FPGA board, thereby reducing the overall power consumption.

16 Claims, 5 Drawing Sheets

(51) Int. Cl.
*G06F 1/32* (2006.01)
*B60L 11/18* (2006.01)
*B60R 16/023* (2006.01)

METHOD AND APPARATUS FOR OPERATING FPGA BOARD IN DRIVERLESS VEHICLE

CROSS-REFERENCE TO RELATED APPLICATION

This application is related to and claims priority from Chinese application No. 201610827237.6, filed on Sep. 14, 2016, entitled "METHOD AND APPARATUS FOR OPERATING FPGA BOARD IN DRIVERLESS VEHICLE", the entire disclosure of which is hereby incorporated by reference.

TECHNICAL FIELD

The present application relates to the field of computer technologies, specifically to the field of autonomous driving technologies, and more specifically to a method and apparatus for operating a field-programmable gate array (FPGA) board in a driverless vehicle.

BACKGROUND

With the rapid development of autonomous driving technologies, to ensure safe driving, driverless vehicles need to implement various functional requirements in real time, for example, positioning, traffic light recognition, route planning, overtaking, avoiding, and so on. However, in order to process various computation requests in real time, the driverless vehicle cannot rely only on a CPU to implement computation, but needs to further use hardware modules such as an FPGA and a GPU to accelerate the algorithm. Current solutions using the FPGA to accelerate the computation of the algorithm require the FPGA to operate at full speed.

However, the FPGA board needs to use all the resources when executing the computing operation at full speed. As a result, the FPGA board generally works in the state with the highest speed and the highest power consumption, leading to power consumption and hardware heat-dissipation problems. Therefore, it is necessary to reduce power consumption of the FPGA board while utilizing the computing power of the FPGA board.

SUMMARY

An objective of the present application is to provide an improved method and apparatus for operating an FPGA board in a driverless vehicle, so as to solve the technical problem mentioned in the Background section.

According to a first aspect, the present application provides a method for operating an FPGA board in a driverless vehicle, the method comprising: collecting driving scenario information on a driving scenario of the driverless vehicle; determining, based on the driving scenario information, a speed at which the driverless vehicle executes a computing operation in the driving scenario; comparing the speed with a speed threshold; and switching a working mode of the FPGA board in the driverless vehicle for executing the computing operation to reduce power consumption of the FPGA board, in response to the speed being lower than the speed threshold.

In some embodiments, the FPGA board comprises a first circuit module and a second circuit module for separately executing the computing operation, and a computing speed and a power consumption of the first circuit module are greater than a computing speed and a power consumption of the second circuit module; and the switching the working mode of the FPGA board in the driverless vehicle for executing the computing operation comprises: switching the computing operation executed by the first circuit module to be executed by the second circuit module.

In some embodiments, the switching the working mode of the FPGA board in the driverless vehicle for executing the computing operation comprises: stopping using the FPGA board to execute the computing operation.

In some embodiments, the method further comprises: using a general-purpose processor on the driverless vehicle to execute the computing operation.

In some embodiments, the driving scenario information comprises a vehicle driving speed; and the determining, based on the driving scenario information, the speed at which the driverless vehicle executes the computing operation in the driving scenario comprises: determining, based on a vehicle driving speed of the driverless vehicle, the speed at which the driverless vehicle executes the computing operation as being positively correlated to the vehicle driving speed.

In some embodiments, the method further comprises: reading operating status information of the FPGA board; determining, based on the operating status information, whether the FPGA board is in an abnormal state; and executing an abnormality processing operation when the FPGA board is in the abnormal state.

In some embodiments, the executing the abnormality processing operation comprises one or more of the following: analyzing a cause of an abnormality occurrence; switching circuit modules for executing the computing operation in the FPGA board; and stopping using the FPGA board to execute the computing operation.

According to a second aspect, the present application provides an apparatus for operating an FPGA board in a driverless vehicle, the apparatus comprising: a collecting unit for collecting driving scenario information on a driving scenario of the driverless vehicle; a determining unit for determining, based on the driving scenario information, a speed at which the driverless vehicle executes a computing operation in the driving scenario; a comparison unit for comparing the speed with a speed threshold; and a switching unit for switching a working mode of the FPGA board in the driverless vehicle for executing the computing operation to reduce power consumption of the FPGA board, in response to the speed being lower than the speed threshold.

In some embodiments, the FPGA board comprises a first circuit module and a second circuit module separately for separately executing the computing operation, and a computing speed and a power consumption of the first circuit module are greater than a computing speed and a power consumption of the second circuit module; and the switching unit is further used for: switching the computing operation executed by the first circuit module to be executed by the second circuit module.

In some embodiments, the switching unit is further used for: stopping using the FPGA board to execute the computing operation.

In some embodiments, the apparatus further comprises: the execution unit for using a general-purpose processor on the driverless vehicle to execute the computing operation.

In some embodiments, the driving scenario information comprises a vehicle driving speed; and the determining unit is further used for: determining, based on the vehicle driving speed of the driverless vehicle, the speed at which the driverless vehicle executes the computing operation as being positively correlated to the vehicle driving speed.

In some embodiments, the apparatus further comprises: the reading unit for reading operating status information of the FPGA board; the judging unit for determining, based on the operating status information, whether the FPGA board is in an abnormal state; and the abnormality processing unit for executing an abnormality processing operation when the FPGA board is in the abnormal state.

In some embodiments, the abnormality processing operation comprises one or more of the following: analyzing a cause of an abnormality occurrence; switching circuit modules executing the computing operation in the FPGA board; and stopping using the FPGA board to execute the computing operation.

According to the method and apparatus for operating an FPGA board in a driverless vehicle provided by the present application, the speed requirement on the computing operation executed by the driverless vehicle is determined based on the driving scenario information of the driverless vehicle, and when the speed requirement low, the FPGA board is switched to a working mode with a low power consumption, thereby implementing the adaptive adjustment of the working mode of the FPGA board, and reducing the overall power consumption of the FPGA board.

BRIEF DESCRIPTION OF THE DRAWINGS

Other features, objectives and advantages of the present application will become more apparent upon reading of the detailed description to the non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
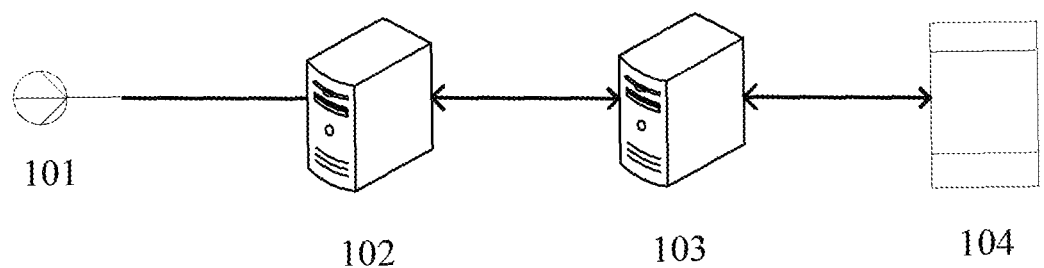
FIG. 1 is a architectural diagram of an exemplary system in which the present application may be implemented.

FIG. 1 shows a system architecture 100 of a driverless vehicle to which a method and apparatus for operating an FPGA board in a driverless vehicle according to embodiments of the present application can be applied.

As shown in FIG. 1, the system architecture 100 may include a vehicle-mounted server 101, a vehicle computing center 102, a vehicle control center 103, and an FPGA board 104. The system architecture 100 may further include other components not shown, which will not be enumerated here.

The vehicle-mounted server 101 may collect driving scenario information of the vehicle when the driverless vehicle is driving, and upload the collected driving scenario information to the vehicle computing center 102.

The vehicle computing center 102 may first analyze and process the driving scenario information uploaded by the vehicle-mounted server 101, to generate an FPGA board control scheme corresponding to the driving scenario information. Then, the vehicle computing center 102 may send a corresponding control command to the FPGA board 104 through the vehicle control center 103 according to the FPGA board control scheme, so that the FPGA board 104 works according to the control command.

The FPGA board is used for executing computing operations for various functions that are run by the driverless vehicle, so as to improve the processing speed to meet the requirement of the driverless vehicle for real time processing. The FPGA board has various different working modes, and may provide in advance an interface to the vehicle control center 103, and the vehicle control center 103 only needs to call the corresponding interface when sending the control command.

It should be noted that the method for operating an FPGA board in a driverless vehicle that is provided in this embodiment of the present application is mainly executed by the vehicle computing center 102, and some steps may also be the vehicle control center 103 or other devices. Correspondingly, the units of the apparatus for operating an FPGA board in a driverless vehicle are mainly disposed in the vehicle computing center 102, and some units may also be disposed in the vehicle control center 103 or other devices.

It should be appreciated that the number of vehicle-mounted servers, the number of vehicle computing centers, the number of vehicle control centers, and the number of FPGA boards in FIG. 1 are merely exemplary. Any number of vehicle-mounted servers, vehicle computing centers, vehicle control centers, and FPGA boards may be set according to implementation requirements.

Figure 2:
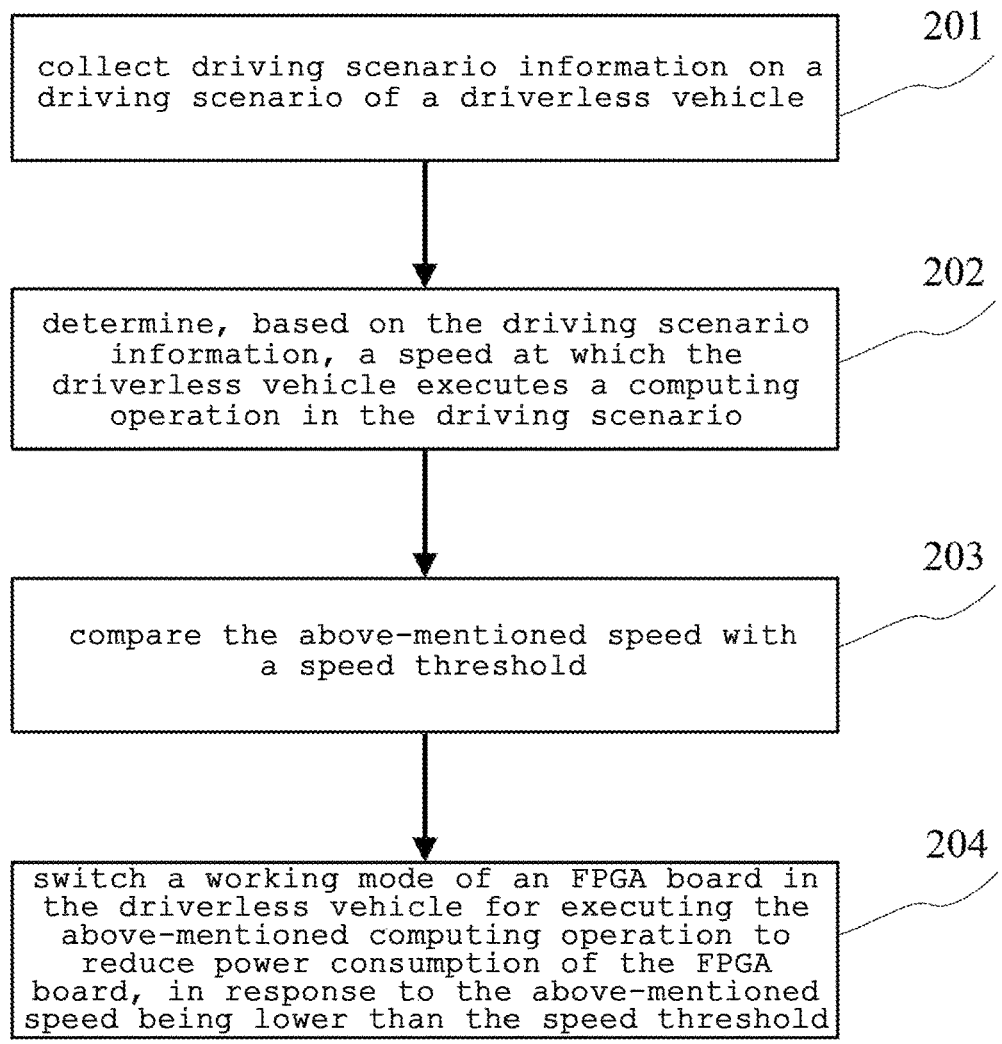
FIG. 2 is a flow chart of a method for operating an FPGA board in a driverless vehicle according to an embodiment of the present application.

Further, referring to FIG. 2, FIG. 2 shows a flow 200 of a method for operating an FPGA board in a driverless vehicle according to an embodiment of the present application. The method for operating an FPGA board in a driverless vehicle includes the following steps:

Step 201. Collect driving scenario information on a driving scenario of a driverless vehicle.

In this embodiment, an electronic device (for example, the vehicle control center shown in FIG. 1) on which the method for operating an FPGA board in a driverless vehicle is run may use a sensor to collect driving scenario information on a driving scenario of a driverless vehicle. The collected driving scenario information may be vehicle driving state information, road sign information, vehicle and pedestrian information, and the like, and may also be other driving scenario information related to the vehicle driving scenario, which is not listed here.

Step 202. Determine, based on the driving scenario information, a speed at which the driverless vehicle executes a computing operation in the driving scenario.

In this embodiment, after collecting the driving scenario information in step 201, the above-mentioned electronic device (for example, the vehicle control center shown in FIG. 1) may analyze the driving scenario information, and determine a computing operation executed by the driverless vehicle in the current scenario and a speed at which the computing operation needs to be executed. The computing operation may be a computing operation corresponding to various functions of the driverless vehicle. These functions include, but not limited to, positioning, traffic light recognition, route planning, overtaking, avoiding, and so on. The computing operation is an algorithm for realizing these functions. For example, in the case of good road condition, it is allowed to take a relatively long time to complete a function such as overtaking and avoiding, that is, there is a low requirement on real-time computation, and only a low computing speed is required; in the case of low visibility, a computing operation such as an image processing operation involved in traffic light recognition requires a large amount of computation, and therefore the computing operation requires a high computing speed.

Step 203. Compare the above-mentioned speed with a speed threshold.

In this embodiment, a speed threshold may be set for each computing operation in advance. after the speed at which the driverless vehicle executes the computing operation in the driving scenario is determined in step 202, the electronic device may compare the calculated speed with the speed threshold, and determine, based on the comparison result, whether to continue to execute subsequent operations.

Step 204. Switch a working mode of the FPGA board in the driverless vehicle that is used for executing the above-mentioned computing operation so as to reduce power consumption of the FPGA board, in response to that the above-mentioned speed is lower than the speed threshold.

In this embodiment, when the comparison result in step 203 is that the speed is lower than the speed threshold, the working mode of the FPGA board in the driverless vehicle that is used for executing the computing operation is switched. The power consumption of the FPGA board in the working mode to which it is switched is lower than that in the working mode before switching, so that the power consumption of the FPGA board can be reduced. Generally, the FPGA board externally provides control interfaces to the control center. Functions realized by these control interfaces include, but not limited to: switching the circuit module of the FPGA board, setting the working time of FPGA board, turning on or off the FPGA board, reading working status information such as the temperature of the FPGA board, and so on. When needing to switch the working mode of the FPGA board, the electronic device only needs to call an interface through the control center to send a corresponding control command to the FPGA board, so as to switch the working mode of the FPGA board by using the control command. For example, the circuit module of the FPGA board may be switched via a call, so as to reduce the power consumption of the FPGA board.

In some optional implementations of this embodiment, the above-mentioned FPGA board includes a first circuit module and a second circuit module that are separately used for executing the above-mentioned computing operation, and the computing speed and a power consumption of the first circuit module are greater than those of the second circuit module; and step 204 includes: switching the computing operation executed by the first circuit module to be executed by the second circuit module. In this implementation, the FPGA board sets, for one computing operation, a first circuit module and a second circuit module that can execute the computing operation. The first circuit module and the second circuit module can both independently execute the computing operation. The first circuit module uses more hardware resources than the second circuit module does when executing the computing operation, and accordingly, the computing speed and power consumption of the first circuit module are greater than those of the second circuit module. Based on this, when the speed is lower than the speed threshold, that is, there is a low speed requirement on the computing operation, the computing operation may be switched executed by the first circuit module to be executed by the second circuit module, so as to reduce the power consumption of the FPGA board.

In some optional implementations of this embodiment, step 204 includes: stopping using the FPGA board to execute the above-mentioned computing operation. In this implementation, when the speed is lower than the speed threshold, using the FPGA board to execute the above-mentioned computing operation may be stopped directly. For example, when a function does not need to be performed, and the speed required for the corresponding computing operation is 0, the execution of the computing operation by the FPGA board may be stopped directly. In this case, the electronic device may send a stop command to the FPGA board through the control center, so as to stop the execution of the computing operation by the FPGA board.

In an optional implementation of the previous implementation, the above-mentioned method further includes: using a general-purpose processor on the driverless vehicle to execute the above-mentioned computing operation. In this implementation, although the computing operation has a low speed requirement, the computing operation needs to be executed by using a processor. In this case, a general-purpose processor with relatively low computing efficiency may be used to execute the computing operation. This implementation allows the general-purpose processor to take over the computing operation when the computing operation has a low requirement on real-time computing, so as to stop the occupation of the FPGA board by the computing operation, thereby reducing the power consumption of the FPGA board.

According to the method provided in the above-mentioned embodiment, the speed requirement on the computing operation executed by the driverless vehicle is determined based on the driving scenario information of the driverless vehicle, and when the speed requirement low, the FPGA board is switched to a working mode with low power consumption, thereby implementing the adaptive adjustment of the working mode of the FPGA board, and reducing the overall power consumption of the FPGA board.

Figure 3:
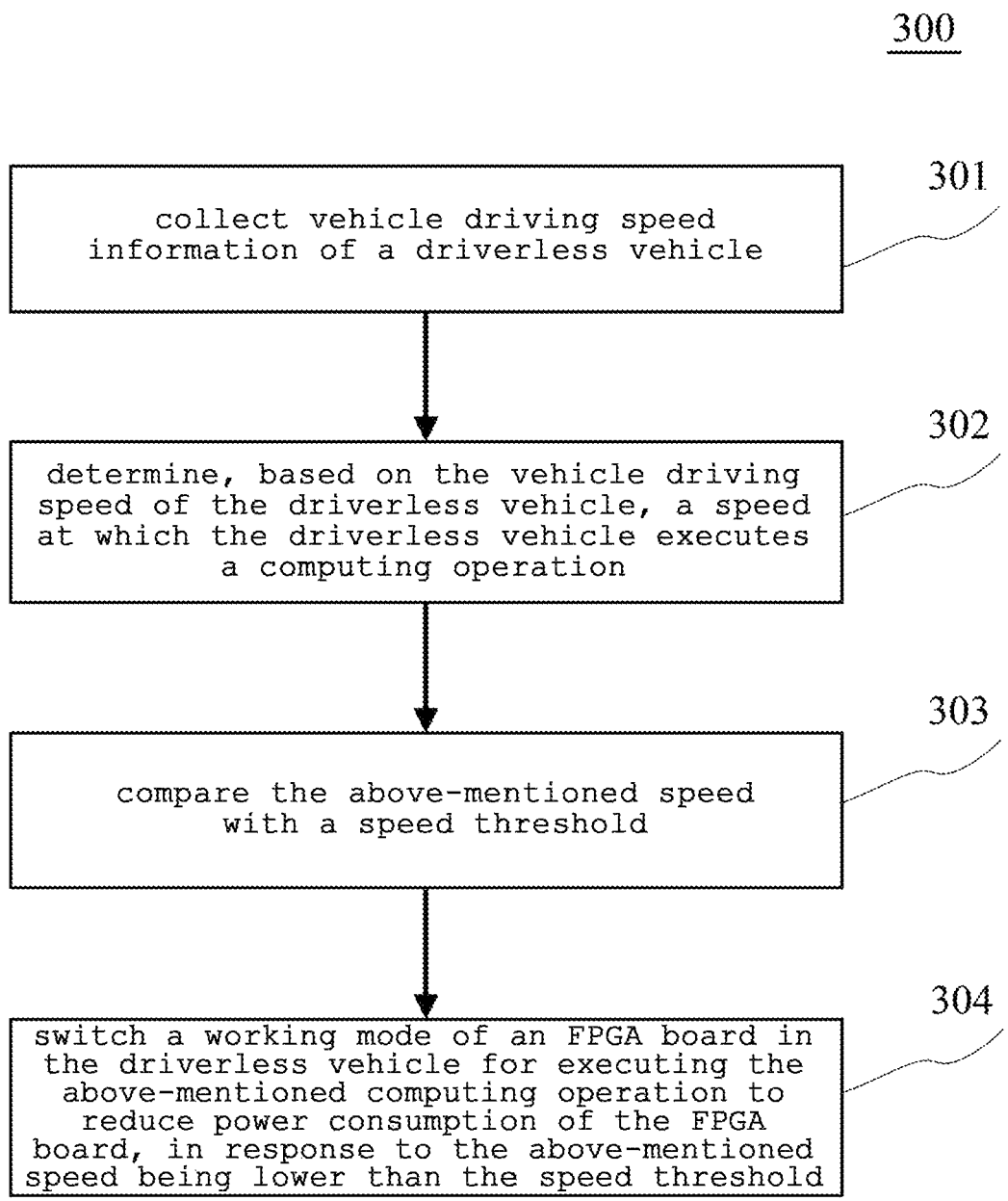
FIG. 3 is a flow chart of a method for operating an FPGA board in a driverless vehicle according to another embodiment of the present application.

Further, referring to FIG. 3, FIG. 3 shows a flow 300 of a method for operating an FPGA board in a driverless vehicle according to another embodiment. The flow 300 of the method includes the following steps:

Step 301. Collect vehicle driving speed information of a driverless vehicle.

In this embodiment, different from step 201, the driving scenario information collected in this embodiment is the vehicle driving speed information.

Step 302. Determine, based on a vehicle driving speed of the driverless vehicle, a speed at which the driverless vehicle executes the computing operation.

In this embodiment, the electronic device may establish in advance an association relationship between the vehicle driving speed and the speed of the computing operation. After the vehicle driving speed information is collected in step 301, the speed at which the driverless vehicle executes the computing operation may be determined based on the vehicle driving speed and the association relationship. The association relationship is a positive correlation relationship.

For the driverless vehicle, a higher vehicle driving speed indicates that the vehicle needs to determine through computing the function to be performed in a shorter time, that is, indicates a higher requirement on real-time computing. In contrast, a lower vehicle driving speed indicates a lower requirement on the speed at which the driverless vehicle executes the computing operation. For example, when the driverless vehicle is driving slowly or stops to wait, a low computing speed is required. Therefore, the vehicle driving speed of the driverless vehicle may be used as a basis for determining the speed of the computing operation.

Step 303. Compare the above-mentioned speed with a speed threshold.

In this embodiment, specific implementation of step 303 can be referred to step 203 in the embodiment corresponding to FIG. 2, and will not be repeatedly described here.

Step 304. Switch a working mode of the FPGA board in the driverless vehicle that is used for executing the above-mentioned computing operation so as to reduce power consumption of the FPGA board, in response to that the above-mentioned speed is lower than the speed threshold.

In this embodiment, specific implementation of step 304 can be referred to step 204 in the embodiment corresponding to FIG. 2, and will not be repeatedly described here.

In some optional implementations of this embodiment, the above-mentioned method further includes: reading operating status information of the FPGA board; determining, based on the operating status information, whether the FPGA board is in an abnormal state; and executing an abnormality processing operation when the FPGA board is in the abnormal state. In this implementation, the FPGA board may externally provide an interface for querying for the operating status information of each circuit module of the FPGA board, so that the electronic device can first call the interface to read the operating status information. The operating status information may be physical status information such as the temperature, power consumption, and running time of the board, or may be alarm information such as that indicating whether the board is working normally. The operating status information may be reported in an interrupted manner by the FPGA board after performing circuit detection.

Then, the electronic device may determine, based on the operating status information, whether the FPGA board is in the abnormal state. Afterward, when determining that the FPGA board is in the abnormal state, the electronic device executes an abnormality processing operation. The abnormality processing operation may be an operation of switching the working mode of the FPGA board, or may be an operation of generating abnormality prompt information. For example, when the working time of the FPGA board exceeds a threshold and the temperature is too high, the electronic device may call the control interface through the control center to set the working time of FPGA board to a lower value.

In an optional implementation of the previous implementation, the executing an abnormality processing operation includes one or more of the following: analyzing a cause of an abnormality occurrence; switching circuit modules that execute the above-mentioned computing operation in the FPGA board; and stopping using the FPGA board to execute the computing operation. Generally, the electronic device may make a comprehensive judgment based on a particular rule according to information collected by sensors, so as to analyze the cause of the abnormality occurrence. In addition, when the abnormality is that the circuit module that is currently responsible for executing the above-mentioned computing operation in the FPGA board fails, the circuit module responsible for executing the computing operation may be switched. When the entire FPGA board is abnormal, the FPGA board may be turned off, and a general-purpose processor is used to take over the computing operation executed by the FPGA board.

As can be seen from FIG. 3, compared with the embodiment corresponding to FIG. 2, the flow 300 of the method for operating an FPGA board in a driverless vehicle in this embodiment highlights the step of determining, based on the vehicle driving speed, the speed at which the driverless vehicle executes the computing operation, so that the working mode of the FPGA board can be switched when the speed is low, thereby reducing power consumption.

Figure 4:
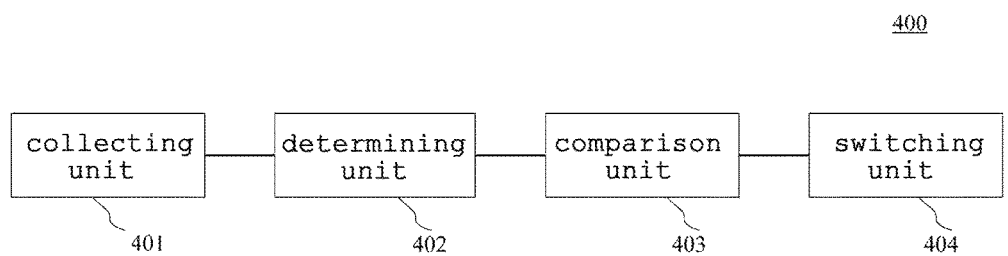
FIG. 4 is a schematic structural diagram of an apparatus for operating an FPGA board in a driverless vehicle according to an embodiment of the present application.

Further, referring to FIG. 4, as an implementation of the methods shown in the above-mentioned figures, the present application provides an embodiment of an apparatus for operating an FPGA board in a driverless vehicle. This apparatus embodiment corresponds to the method embodiment shown in FIG. 2. The apparatus may be specifically applied to various electronic devices.

As shown in FIG. 4, the apparatus 400 for operating an FPGA board in a driverless vehicle of this embodiment includes: a collecting unit 401, a determining unit 402, a comparison unit 403, and a switching unit 404. The collecting unit 401 is used for collecting driving scenario information on a driving scenario of a driverless vehicle; the determining unit 402 is used for determining, based on the driving scenario information, a speed at which the driverless vehicle executes a computing operation in the driving scenario. The comparison unit 403 is used for comparing the above-mentioned speed with a speed threshold. The switching unit 404 is used for switching a working mode of the FPGA board in the driverless vehicle that is used for executing the above-mentioned computing operation so as to reduce power consumption of the FPGA board, in response to that the above-mentioned speed is lower than the speed threshold.

In this embodiment, specific implementations of the collecting unit 401, the determining unit 402, the comparison unit 403, and the switching unit 404 in the apparatus 400 can be referred to step 201, step 202, step 203, and step 204 in the embodiment corresponding to FIG. 2, and will not be repeatedly described here.

In some optional implementations of this embodiment, the above-mentioned FPGA board includes a first circuit module and a second circuit module that are separately used for executing the above-mentioned computing operation, and the computing speed and power consumption of the first circuit module are greater than those of the second circuit module; and the switching unit 404 is further used for: switching the above-mentioned computing operation executed by the first circuit module to be executed by the second circuit module. Specific implementation of this implementation can be referred to the corresponding implementation in the embodiment corresponding to FIG. 2, and will not be repeatedly described here.

In some optional implementations of this embodiment, the switching unit 404 is further used for: stopping using the FPGA board to execute the above-mentioned computing operation. Specific implementation of this implementation can be referred to the corresponding implementation in the embodiment corresponding to FIG. 2, and will not be repeatedly described here.

In some optional implementations of this embodiment, the apparatus 400 further includes: an execution unit (not shown) for using a general-purpose processor on the driverless vehicle to execute the computing operation. Specific implementation of this implementation can be referred to the corresponding implementation in the embodiment corresponding to FIG. 2, and will not be repeatedly described here.

In some optional implementations of this embodiment, the above-mentioned driving scenario information includes a vehicle driving speed; and the determining unit 404 is further used for determining, based on a vehicle driving speed of the driverless vehicle, a speed at which the driverless vehicle executes the computing operation as being positively correlated to the vehicle driving speed. Specific implementation of this implementation can be referred to the corresponding step in the embodiment corresponding to FIG. 3, and will not be repeatedly described here.

In some optional implementations of this embodiment, the apparatus 400 further includes: a reading unit for reading operating status information of the FPGA board; a judging unit for determining, based on the operating status information, whether the FPGA board is in an abnormal state; and an abnormality processing unit for executing an abnormality processing operation when the FPGA board is in the abnormal state. Specific implementation of this implementation can be referred to the corresponding implementation in the embodiment corresponding to FIG. 3, and will not be repeatedly described here.

In some optional implementations of this embodiment, the above-mentioned abnormality processing operation includes one or more of the following: analyzing a cause of an abnormality occurrence; switching circuit modules that execute the computing operation in the FPGA board; and stopping using the FPGA board to execute the computing operation. Specific implementation of this implementation can be referred to the corresponding implementation in the embodiment corresponding to FIG. 3, and will not be repeatedly described here.

Figure 5:
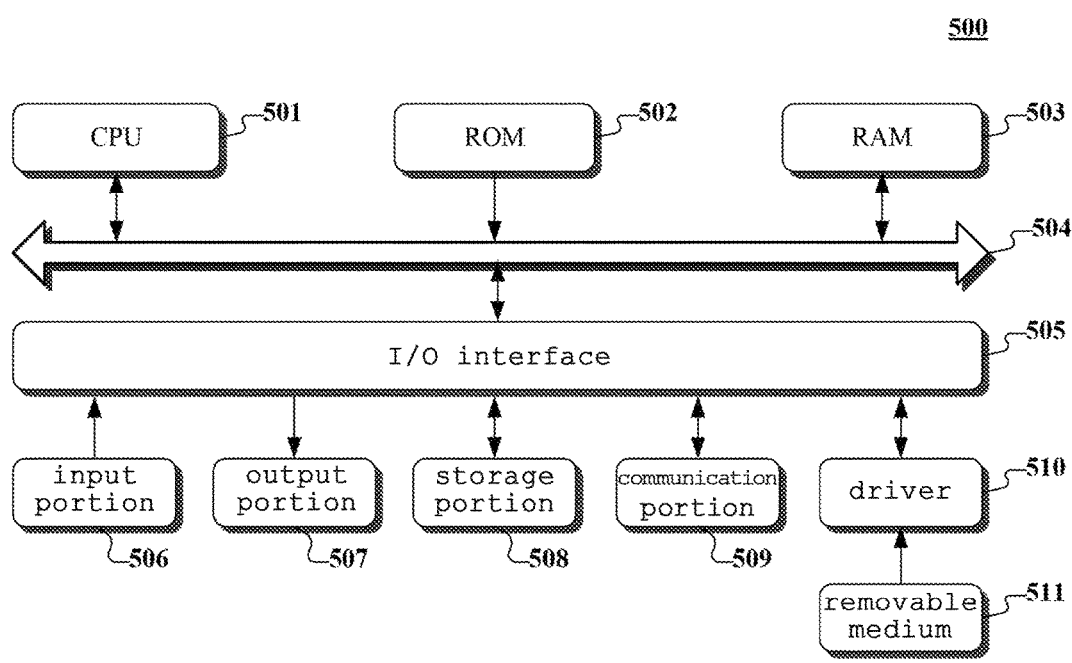
FIG. 5 illustrates a structural schematic diagram of a computer system adapted to implement a computing center according to an embodiment of the present application.

Referring to FIG. 5, a schematic structural diagram of a computer system 500 adapted to implement a computing center of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising an obtaining unit, a determining unit, a comparing unit and a switching unit, where the names of these units are not considered as a limitation to the units. For example, the receiving unit may also be described as "a unit for receiving driving scenario information on a driving scenario of a driverless vehicle".

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The programs are used by one or more processors to execute the method described in the present application: collecting driving scenario information on a driving scenario of the driverless vehicle; determining, based on the driving scenario information, a speed at which the driverless vehicle executes a computing operation in the driving scenario; comparing the speed with a speed threshold; and switching a working mode of the FPGA board in the driverless vehicle for executing the computing operation to reduce power consumption of the FPGA board, in response to the speed being lower than the speed threshold.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for operating a field-programmable gate array (FPGA) board in a driverless vehicle, comprising:
    collecting driving scenario information on a driving scenario of the driverless vehicle;
    determining, based on the driving scenario information, a speed at which the driverless vehicle executes a computing operation in the driving scenario wherein the computing operation is executed for realizing a function of the driverless vehicle, and is executed at different speeds in different driving scenarios;
    comparing the speed with a speed threshold; and
    switching a working mode of the FPGA board in the driverless vehicle for executing the computing operation to reduce power consumption of the FPGA board, in response to the speed being lower than the speed threshold.

2. The method according to claim 1, wherein the FPGA board comprises a first circuit module and a second circuit module for separately executing the computing operation, and a computing speed and a power consumption of the first circuit module are greater than a computing speed and a power consumption of the second circuit module; and
    the switching the working mode of the FPGA board in the driverless vehicle for executing the computing operation comprises:
    switching the computing operation executed by the first circuit module to be executed by the second circuit module.

3. The method according to claim 1, wherein the switching the working mode of the FPGA board in the driverless vehicle for executing the computing operation comprises:
    stopping using the FPGA board to execute the computing operation.

4. The method according to claim 3, further comprising:
    using a general-purpose processor on the driverless vehicle to execute the computing operation.

5. The method according to claim 1, wherein the driving scenario information comprises a vehicle driving speed; and
    the determining, based on the driving scenario information, the speed at which the driverless vehicle executes the computing operation in the driving scenario comprises:
    determining, based on the vehicle driving speed of the driverless vehicle, the speed at which the driverless vehicle executes the computing operation as being positively correlated to the vehicle driving speed.

6. The method according to claim 1, further comprising:
    reading operating status information of the FPGA board;
    determining, based on the operating status information, whether the FPGA board is in an abnormal state; and
    executing an abnormality processing operation when the FPGA board is in the abnormal state.

7. The method according to claim 6, wherein the executing the abnormality processing operation comprises one or more of the following:
    analyzing a cause of an abnormality occurrence;
    switching circuit modules for executing the computing operation in the FPGA board; and
    stopping using the FPGA board to execute the computing operation.

8. The method according to claim 1, wherein the function of the driverless vehicle comprises positioning, traffic light recognition, route planning, overtaking, or avoiding.

9. The method according to claim 1, wherein the driving scenario information comprises vehicle driving state information, road sign information, and vehicle and pedestrian information.

10. An apparatus for operating a field-programmable gate array (FPGA) board in a driverless vehicle, comprising:
    at least one processor; and
    a memory storing instructions, which when executed by the at least one processor, cause the at least one processor to perform operations, the operations comprising:
    collecting driving scenario information on a driving scenario of the driverless vehicle;
    determining, based on the driving scenario information, a speed at which the driverless vehicle executes a computing operation in the driving scenario wherein the computing operation is executed for realizing a function of the driverless vehicle, and is executed at different speeds in different driving scenarios;
    comparing the speed with a speed threshold; and
    switching a working mode of the FPGA board in the driverless vehicle for executing the computing operation to reduce power consumption of the FPGA board, in response to the speed being lower than the speed threshold.

11. The apparatus according to claim 10, wherein the FPGA board comprises a first circuit module and a second circuit module for separately executing the computing operation, and a computing speed and a power consumption of the first circuit module are greater than a computing speed and a power consumption of the second circuit module; and
    the switching the working mode of the FPGA board in the driverless vehicle for executing the computing operation comprises:
    switching the computing operation executed by the first circuit module to be executed by the second circuit module.

12. The apparatus according to claim 10, wherein the switching the working mode of the FPGA board in the driverless vehicle for executing the computing operation comprises:
    stopping using the FPGA board to execute the computing operation.

13. The apparatus according to claim 12, wherein the operations further comprise:
    using a general-purpose processor on the driverless vehicle to execute the computing operation.

14. The apparatus according to claim 10, wherein the driving scenario information comprises a vehicle driving speed; and
    the determining, based on the driving scenario information, the speed at which the driverless vehicle executes the computing operation in the driving scenario comprises:
    determining, based on the vehicle driving speed of the driverless vehicle, the speed at which the driverless vehicle executes the computing operation as being positively correlated to the vehicle driving speed.

15. The apparatus according to claim 10, wherein the operations further comprise:
    reading operating status information of the FPGA board;
    determining, based on the operating status information, whether the FPGA board is in an abnormal state; and executing an abnormality processing operation when the FPGA board is in the abnormal state.

16. The apparatus according to claim 15, wherein the executing the abnormality processing operation comprises one or more of the following:

analyzing a cause of an abnormality occurrence;

switching circuit modules for executing the computing operation in the FPGA board; and stopping using the FPGA board to execute the computing operation.

* * * * *